United States Patent [19]

Blank et al.

[11] Patent Number: 4,521,120

[45] Date of Patent: Jun. 4, 1985

[54] FOREST FIRE RATE OF SPREAD WITH TIMERS METHOD

[75] Inventors: Richard W. Blank, Haslett; Albert J. Simard, Dumond Dale, both of Mich.

[73] Assignee: The United States of America as represented by the Secretary of Agriculture, Washington, D.C.

[21] Appl. No.: 532,411

[22] Filed: Sep. 15, 1983

[51] Int. Cl.[3] .............................................. G01K 3/04

[52] U.S. Cl. .................................... 374/102; 340/577; 368/10; 374/166

[58] Field of Search ....................... 374/102, 103, 166; 73/86; 340/577, 590, 593; 368/10, 11

[56] References Cited

U.S. PATENT DOCUMENTS

| | | | |
|---|---|---|---|
| 2,126,530 | 8/1938 | Black et al. | 340/591 |
| 2,587,762 | 3/1952 | Reese | 340/590 X |
| 3,420,575 | 1/1969 | Hubner | 340/577 X |
| 3,621,262 | 11/1971 | Lecuyer | 340/577 |
| 3,644,748 | 2/1972 | Lord | 340/577 |
| 3,914,662 | 10/1975 | Bianchini | 340/578 |
| 3,943,499 | 3/1976 | Dunphy | 340/578 X |
| 3,965,743 | 6/1976 | Turner | 368/11 X |
| 3,999,370 | 12/1976 | Morokawa et al. | 368/200 |
| 4,044,348 | 8/1977 | Huebscher | 340/588 |

OTHER PUBLICATIONS

"Unidirectional Sampling of Wildland Fire Spread", A. J. Simard et al., Fire Technology (NFPA), Aug. 1982, pp. 221-228.

*Primary Examiner*—Daniel M. Yasich
*Attorney, Agent, or Firm*—M. Howard Silverstein; David G. McCounell

[57] ABSTRACT

A timer for use in determining rate of spread of a forest fire utilizing an uninsulated case with a clock circuit operated by a temperature-operated switch, preferably a solder switch, and a method for determining the rate of spread of a forest fire utilizing said timers and computing the rate of spread of a forest fire from the time differences and the pattern of deployment of said timers on the floor of the forest.

5 Claims, 2 Drawing Figures

FOREST FIRE RATE OF SPREAD WITH TIMERS METHOD

FIELD OF THE INVENTION

The invention relates to a method for detecting the rate of spread of a forest fire and the apparatus for implementing the method.

BACKGROUND OF THE INVENTION

It is desirable to be able to measure the rate of spread of a fire in forest or wildland areas, however the methods and equipment previously available were either inadequate for the task or too expensive for extensive measuring projects.

Current techniques for measuring rate of spread can be grouped into three classes: visual, mechanical, and electronic. Visual observations, either manual or photographic, are constrained by the requirements that the apparatus or observer see what is actually happening and to provide a safe position from which to observe. As for example, a random measuring system as is customarily used cannot be utilized in a burned area except in a low-intensity fire or a fire occuring within a small area because of the necessity that the point being observed be actually visible and also far enough away to be safe. Mechanical observations again require a safe vantage point and also have tended to require long set up times making the measurement of large fire areas very impractical. Electronic measurements are also possible using thermocouples and recording apparatus, however, previous electronic equipment proposed has had the extreme disadvantage of high cost, again limiting the areas that may be monitored thereby making routine and ongoing measuring programs very impractical.

Because a systematic survey of the rate of spread of forest fire requires equipment that can accommodate the highly variable characteristics of such fire, including the variable way in which such fires spread and the differences in local spread rates when compared to the spread rate of the fire as a whole. Also, the extreme heat that is associated with a forest fire has had the disadvantage of causing equipment malfunction and therefore requiring more expensive equipment in order to ensure the accuracy of measurements obtained.

Therefore, there is need for a low cost electronic method for measuring the rate of spread of forest fires and also for low cost equipment items that can be utilized in conjunction with such method.

SUMMARY OF THE INVENTION

A low-cost timer and the method for its application in the measurement of the rate of spread of forest fires are the basic subject matter under consideration.

One aspect of the present invention provides a timer for use in determining the rate of spread of a forest fire comprising a case with a clock circuit operated electronically with a temperature operated switch.

Another aspect of the present invention provides a method for detecting the rate of spread of a forest fire comprising the steps of locating a plurality of temperature-actuated timers in a spatial pattern in the expected path of a forest fire; recovering said timers; recording the time differences between said timers; measuring the distance between timers; and computing the rate of fire spread with final display of the results of said computation.

DESCRIPTION OF THE PRIOR ART

U.S. Pat. No. 3,420,575 to Hubner discloses a method and device for following combustion in mines and the like. This is a device and method for following the movement of a flame front through a mine or other subterranean structure wherein a sampling tube of thermally destructible material is inserted through a firewall into a mine tunnel.

BRIEF DESCRIPTION OF THE DRAWINGS

The best mode contemplated in carrying out this invention is better understood by reference to the following detailed description when considered in conjunction with the accompanying drawing, in which.

DETAILED DESCRIPTION OF THE INVENTION

Figure 1:
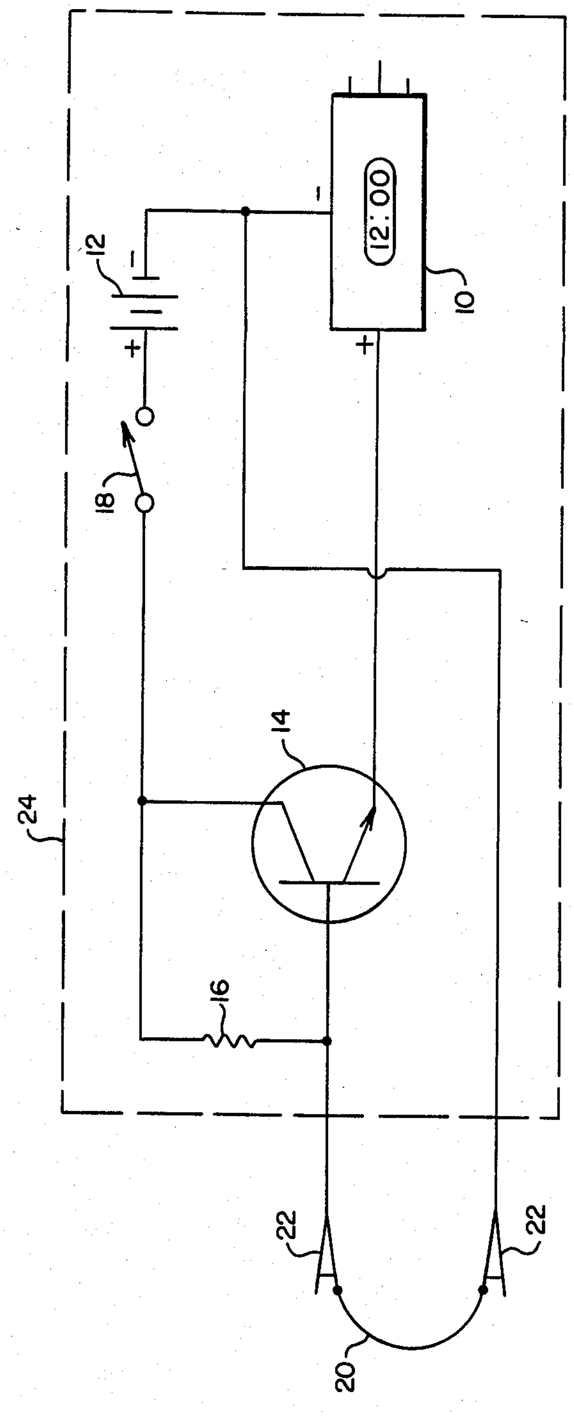
FIG. 1 is a electrical schematic diagram of a timer in accordance with the present invention.

We discovered that a timer device if suitably cased does not require insulation but may make use of the insulation qualities of the ground by being buried approximately 2 to 6 inches (50 to 150 mm) in depth in the ground of the forest area to be monitored. The suitably cased timer unit, more fully described below, at best represents a single point of data which is of limited use in determining rate of spread of forest fire data without comparison to other discrete points of data, therefore in order to properly make use of such a cased timer, a plurality of such units must be deployed on the forest floor in any known geometric pattern that is not a straight line in order that the data being retrieved from such timers be properly representative of the conditions over a period of time so as to allow computation of the rate of spread of a forest fire.

The fundamental concept involved in the proper utilization of the timer is that the timer does not begin to operate until it has been actuated by the heat of a forest fire. By circuitry more fully described below each timer is buried initially with the timer off. Therefore the data that will actually be retrieved following a forest fire across the geographical area that is covered by a grid or pattern of such timers will be the differential time between discrete points of detection, each timer being separately turned on as the fire reaches its location. By correlating such time differences with spatial distances in the pattern, the rate of spread of the forest fire may be locally as well as broadly determined by computational methods well known in the art, see Fire Technology, Aug.; 1982, pages 221–228, published by National Fire Protection Association, the article by Simard et al. which is incorporated herein by reference. It will be appreciated that a flame front is not obligated to propagate in the direction of a grid of detectors and most likely will travel in some direction requiring a geometric solution to the problem of flame propagation direction as well as further analysis of flame spread rates. Rate of spread is therefore a term which includes direction much as a vector quantity. The true rate of spread is the maximum value of distance per unit time computed for a plot of timers.

It is conventional to grid or locate detectors in a geometric pattern over the entire expected fire area.

However, according to the present invention, researchers utilize a sampling process to establish a group of triangular plots, on which the detailed fire behavior, fuel, and experimental observations at several local areas may be obtained. Plot groups may be arranged in triangular fashion, thereby allowing the area between the local plots to be treated as a large plot. By noting the time that the common corner of each plot is reached an algorithm may be utilized to determine the average direction and rate of spread for the triangular area between the plots. In this way, small-scale phenomenon such as soil nutrient changes can be studied on small plots at the same time that the large-scale processes such as overstory tree mortality can be studied using coarser, large area measurements. It must also be borne in mind that the plot area must not allow for too much space between detectors since the greater the spacing the more the local ambiguities of behavior of a forest fire will cause abberant data to be obtained. We have additionally developed a 13-point grid which although incorporating considerable redundancy, ties more triangles together than any other known plotting method. Where individual plots or grids are to be utilized in isolated areas a 5-point grid is recommended over a 4-point grid, a centrally located point to a square providing a backup should a one timer fail. In this way the observer of the data need not rely solely on the reliability of the instruments themselves but has made use of a level of redundancy to assure and check the validity of the results obtained.

FIG. 1 is a logical schematic diagram of a timer in accordance with the present invention. A clock 10, preferably a narrow ladies pendant watch with digital liquid crystal display and built-in reset buttons, is connected to battery 12, preferably two (2) hearing aide batteries in order to maintain small size of the final timer. The circuit is driven by transistor 14, and type NPN No. ZN2222 transistor that is based biased by resistor 16, a 22K ohm resistor which draws ¼ watt of power. The clock circuit may be held open by switch 18, as for example a micro-miniature single-pull, single-throw toggle switch located on the positive side of the battery 12, or by the removal as by melting of external low melting alloy solder switch 20 which is attached by means of high temperature wires to the circuitry either the negative side of the battery 12 or to the transistor 14 base. The solder switch 20 is preferably attached to the high temperature wires by alligator clips 22 for easy removal and replacement. The high temperature wires extend outside the case 24 so that the switch may be located above ground level after the casing 24 has been buried in the ground.

The case 24 comprises a ¾ inch (19 mm) thin-walled copper pipe section, preferably 3¾ inches (95.25 mm) long capped at both ends, the top cap being modified and removable and carrying the high temperature wires from the circuitry to the location of the external solder switch 20. The high temperature wire utilized is preferably thermocouple wire with high temperature insulation since it must stand repeated direct contact with fires in the vicinity of the external solder switch 20 which is exposed above ground to the forest fire. Other logistical problems involve prevention of moisture from inadvertently closing the circuit and stopping the clock. This is accomplished by waterproofing the first 2 to 3 inches of wire closest to the timer at the case and also sealing the wires into the top cap of the pipe case 24 so that moisture is prevented from entering into the casing.

In operation with the switch 18 closed and with the external solder switch 20 still intact and connected across the lead wires, current passes through resistor 16 and bypasses the clock 10. When the solder melts, the transistor 14 acts as a switch transferring the flow current through the clock 10. The current flow starts the clock running. The clock continues to run until switch 18 is opened or a connection is made across the external solder connections near the alligator clips 22. Should the circuit be shorted across the alligator clips 22 current will cease flowing through the clock. Note that the clock would also stop if water or any other conducting material were to cause the circuit to short to effectively cause solder switch 20 to be closed. Voltage requirements are very low in the circuit recommended and the clock is capable of operating or being on hold for months at a time. The timer itself should be buried only as long as necessary however, since internal moisture condensation may cause erratic behavior of the timer system. If the timer is expected to be in the ground for more than several days it is suggested that a small amount of desicant be inserted in the base of the case. The recommended minimum timer spacing is such that the fire will take at least one minute to spread from one timer to the next. Based upon the average error of trigger timer in a sample set of timers, the average error on one minute timings would be approximately 4 percent which, although not ideal, is certainly acceptable for most measurement techniques. The wider the timer spacing, i.e. 2 to 3 minutes, the less the error however, the greater the problems due to local aberrances in the behavior of a fire.

We recommend the use of a 2-person crew to install the equipment in the path of a five, one to perform the mechanical tasks and the other to carry the equipment. To deploy the unit, a 6-inch deep 1-inch diameter hole is made in the soil; a tree-planting dibble for container stock works well for this purpose. After the hole has been drilled, the timer is removed from its casing and the switch 18 is closed. To verify that the clock is working the solder trigger 20 may be removed. Then replace the timer in the case, recap it and place it in the hole and cover it with 1 to 2 inches of soil with the external solder switch 20 exposed to 2 inches above the surface of the ground. Finally, verify that the clips 22 have not loosened in handling and then mark the location with at least a 2 foot (600 mm) long steel rod that may be located following a fire in the area. Each timer and its location should be recorded and each timer should have a number on the casing so that the data may be properly utilized after recovery of the timers following a fire.

In a freed test a fire is ignited, a stopwatch is started at the nearest time to the point of ignition. In a real fire situation the stop watch may be started anytime. As each timer is retrieved after the fire passed over, the hours and minutes are recorded for each timer number. the simultaneous stopwatch reading corresponding to the recorded timer reading is also recorded next to each timer number. The recorded time on the timer must be subtracted from the recorded time on the stopwatch for each of the timers in order to obtain the true time differential from point to point. For example, if three timers are located and the time differentials are A-1 hr. 13 min., B-1 hr. 16 min., and C-1 hr. 18 min., that data will show that the fire passed over point B 3 minutes after it passed over point A, etc.

An advantage of this type of timer is that it is extremely low in cost with an estimated current cost of approximately $9.50 per unit. Such a low cost per unit allows wide use of the timers and gridding of large forest areas during the forest fire season so that the best possible data may be obtained at a reasonable cost. Obviously the greater the number of timers in the system, the greater will be the time and direction information available and the better one can determine the speed of fire movement.

Figure 2:
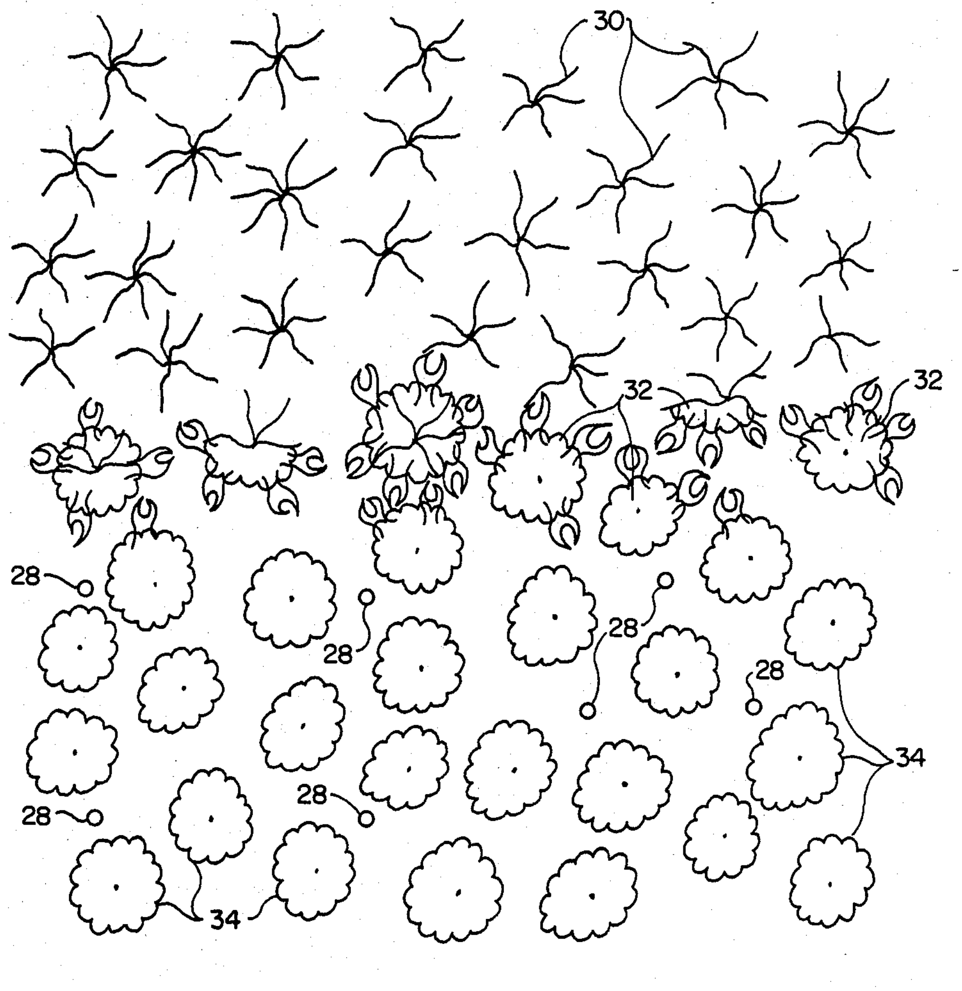
FIG. 2 is a schematic plan view of a pattern of timers at the site of a forest fire.

FIG. 2 shows a fire line approaching a plurality of timers 28 each similar to the timer shown in FIG. 1 and arranged to allow the rate of spread of the fire to be determined after the fire has passed over, the distance between timer points measured and the timer activation, differential determined. Burned trees 30, flaming trees 32 and trees with foliage 34 are shown for illustrative purposes only.

It will be appreciated that numerous changes and modifications may be made in the above described embodiments of the invention without departing from the scope thereof. Accordingly, the foregoing description is to be construed in an illustrative and not a limitative sense, the scope of the invention being defined solely by the appended claims.

We claim:

1. A method for determining the rate of spread of a forest fire comprising the steps of: locating at least three temperature-actuated timers in a spatial pattern in the expected path of a forest fire, each timer having a low melting alloy switch detachably connected thereto; allowing the forest fire to pass over each one of the timers, thereby melting said switch and actuating each of the timers when the fire reaches said timers; recovering said timers; determining the differences between the times of actuation of said timers; measuring the distance between timers, correlating the time differences and distance measurements to determine the rate of spread of the forest fire.

2. The method according to claim 1 wherein said timer comprises a case and a clock operated by an electrical circuit.

3. The method according to claim 1 wherein said spatial pattern is triangular.

4. The method according to claim 1 wherein said spatial pattern is a series of rectangles with a time located at the corners and center point of each rectangle.

5. The method according to claim 1 wherein said timers are set at a known initial value such that the time since actuation may be determined upon recovery.

* * * * *